INVENTORS
MELVIN HOTZ
DANIEL E. HILL 3,336,594
OPTICAL SYSTEM FOR TESTING MAPPING
RADAR
Melvin Hotz and Daniel E. Hill, Baltimore, Md., assignors, by mesne assignments, to the United States of America as represented by the Secretary of the Air Force
Filed Aug. 31, 1965, Ser. No. 484,137
2 Claims. (Cl. 343—17.7)

This invention relates to a circuit for testing the operation and condition of a rapid mapping radar system, and more particularly to a test circuit which results in a test pattern output which can be evaluated by inexperienced personnel.

Conventional radar checkout by expert technicians attempt to perform the evaluation by feel, by experience, and by the evaluation and analysis of data from many separate items of general test equipment. Such testing would include measurement of transmitter power output, receiver noise figure and sensitivity checks, separate tests to determine recorder operation, film observations, measurements and microdensitometer evaluation of film strips, and observations of system waveforms and voltage checks. Generally these tests are complicated, slow and require highly trained and skilled operators. The resultant conclusions are often inconsistent since each test interpretation is dependent upon operator judgment. A more scientific and less time consuming approach is desirable.

The equipment described in this invention provides a means for performing a rapid mapping radar system checkout by providing a series of programmed signals which enter the radar as R.F. signals and which are recorded by the radar recorder on the film strip as patterns. The film evaluator of the test set automatically evaluates the film strip patterns. Results of this evaluation are displayed as go, no-go signals.

The philosophy of the Radar Test Set is to provide a complete subsystem checkout with a single compact test unit with one setup time and requiring no operator interpretations or decisions. The function is a check of overall subsystem performance. No operator interpretation is required as the test equipment provides a go, no-go indication.

It is accordingly one object of this invention to provide a new and improved radar testing apparatus which does not depend on operator interpretation to check overall performance of a radar system.

It is another object of this invention to provide an improved radar testing apparatus for quickly and automatically checking the operating performance of a radar system.

The invention itself will be best understood from the following description of specific embodiments when read in connection with the accompanying drawings, in which.

In accordance with the invention, the Test Set is operated in the following manner:

(1) The Radar Test Set is connected to its primary power and to the radar under test.

(2) The controls of the radar set are placed in the proper positions by the operator.

(3) The test set will check critical operating D-C voltages and then proceed to generate the test pattern that will test the system.

(4) The processed film (the normal output from a mapping radar system) is removed from the recorder by the operator and placed in the film evaluator section of the test set. The film evaluator will indicate the condition of the radar system.

Before discussing the mapping radar test equipment, it may be helpful to first briefly describe a typical mapping radar. A mapping radar system is used to provide a high resolution map of the terrain over which the mapping radar aircraft flies. The radar transmits a short pulse which is reflected from the terrain and detected by the radar receiver. The response from each pulse is recorded on film in the proper space relationship to other pulses and a radar map is the result. There is no visual display to permit quick inspection of the results being recorded by the radar system; therefore a test method which enables the operator to rapidly determine the condition of the radar must be provided.

Figure 1:
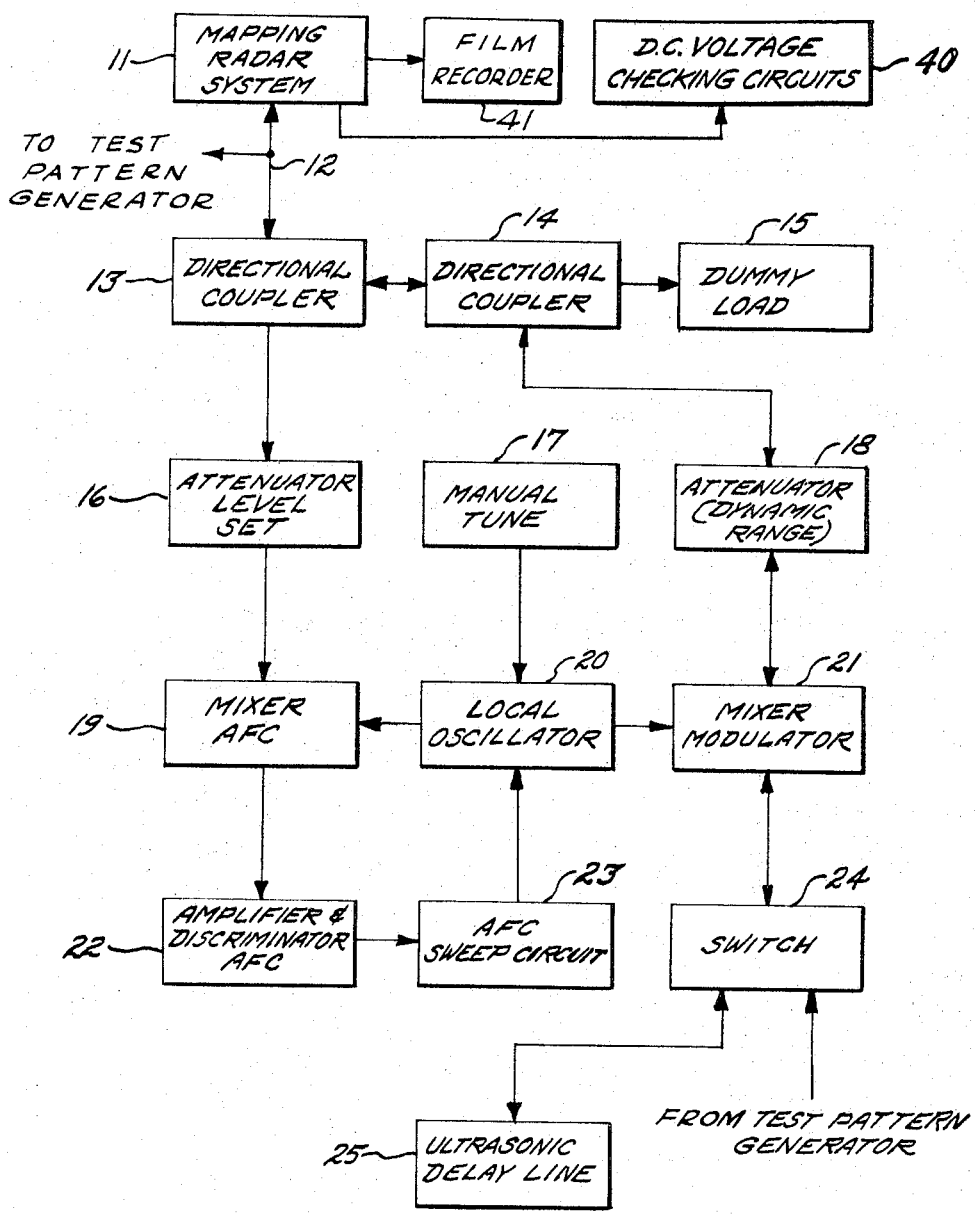
FIG. 1 is a block diagram of the transponder portion of the test system, showing the connections of the test set to a mapping radar system.

The mapping radar test set consists of five basic assemblies:

(1) Transponder
(2) Test pattern generator
(3) Control panel
(4) Film scanner
(5) Scanner electronics The transponder assembly comprises the signal generator which provides the R.F. signal for the radar system under test. In FIG. 1, sample 12 of the radar system transmitter signal is fed through coupler 13 and attenuator level set 16 to mixer 19.

Most of the radar system output energy is fed via directional coupler network 13 and 14 to dummy load 15 where it is dissipated. The remaining energy is fed from directional coupler 14 to attenuator 18, then to mixer modulator 21. It is then fed to delay line 25 via switch 24. The output of local oscillator 20 is combined in mixer 21 with an attenuated sample of the radar transmitted output signal to produce the radar intermediate frequency. Oscillator 20 is also coupled to mixer 19 where its output signal is heterodyned with a low level transmitter pulse to produce AFC intermediate frequency signals for maintaining correct frequency input so that return signals will be in proper tune with the radar receivers. The AFC amplifier and discriminator 22 and the AFC Sweep circuit 23 serve to keep the local oscillator at the proper frequency for maintaining the transponder at a frequency compatible with the radar transmitter frequency. The manual tune block 17, provides for adjustment of the local oscillator klystron. The intermediate frequency is generated by heterodyning the local oscillator frequency with the attenuated transmitter pulse. The pulse is coupled via the mixer modulator and switch 24 to the ultrasonic delay line 25. Switch 24 can be a manually operated switch which is utilized during one portion of the test sequence to provide a path between ultrasonic delay line 25 and mixer modulator 21. Used in an alternate position, switch 24 provides a path between the test pattern generator and the mixer modulator 21. The ultra-sonic quartz line responds to the I.F. pulse with a train of pulses which decay with time. This train of pulses is mixed with the local oscillator to heterodyne them up to the radar frequency. Delay line 25 is caused to ring by the output pulse coupled via mixer modulator 21 and switch 24. The output from delay line 25 is a train of pulses which are returned to microwave mixer modulator 21 where it is heterodyned with the signal from local oscillator 20 to obtain microwave frequency. The signal is returned to the radar via the same microwave plumbing which the transmitter pulse was obtained. Switch 24 and attenuator 18 are adjusted to provide this return path during this portion of the test operation. The train of pulses, now at the radar frequency is attenuated and coupled into the radar where it can be detected by the radar receiver. The attenuator block 18, is a precision step attenuator which is set at a predetermined stop during all tests except dynamic range when it is controlled in steps from minimum to maximum attenuation.

Figure 2:
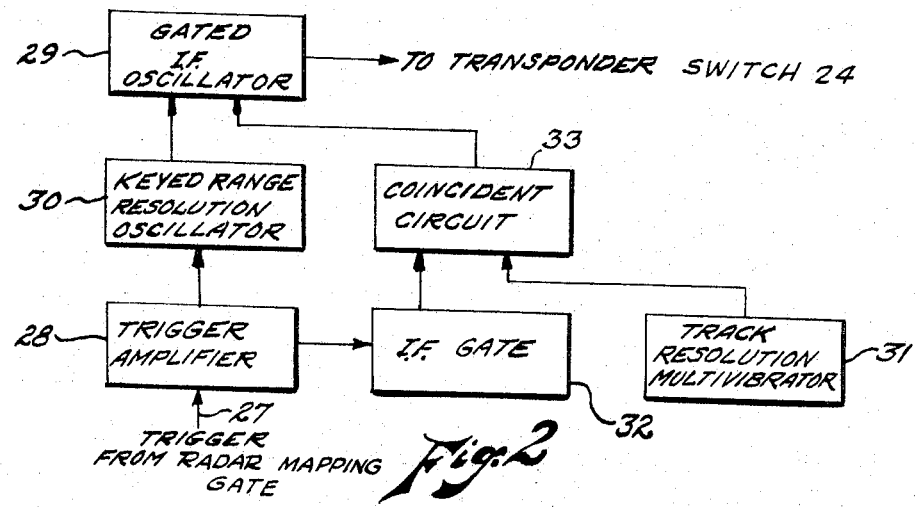
FIG. 2 is a block diagram of the test pattern generator showing the method of connections to the transponder.

The test pattern generator develops the test pattern. In FIG. 2, trigger amplifier 28 is fed from transponder via conductor 27 in order to synchronize the test pattern with the radar recorder sweep. The trigger fed to amplifier 28 is derived directly from the radar mapping gate signal. That is, the trigger appears coincident with the mapping time period and comes from the transponder in the sense that the transponder is the interface. The trigger from the radar may be obtained from a port in directional coupler 14 or, as shown in FIGURE 1, may be derived directly from the radar. The portion of the test pattern generator which provides the modulation for the microwave signals consists of gated intermediate frequency oscillator 29, keyed range resolution oscillator 30, and the track resolution multivibrator 31, the intermediate frequency gate circuits 32 and the coincident circuit 33.

The basic function of the test generator is to provide signals for testing the range and track resolution, detection capability, and the dynamic range of the mapping radar under test. For range resolution, a signal consisting of pulses at close proximity is produced during the mapping time period by the keyed range resolution oscillator 30 to simulate targets whose spacing is near the system resolution limit. The pulses will describe parallel lines on the film with respect to the direction of motion of the film. It can then be determined whether the resolution meets minimum acceptable requirements of the system by observation of the resultant test film strip.

The definition of resolution for track is the same as that for range resolution except that it is measured in the track direction, or orthogonal to range resolution. The test signal is obtained from free-running multivibrator 31 and then fed to coincident circuit 33. The result is a signal positioned in time so as to be synchronized to the radar transmitted pulse. The frequency of the multivibrator determines the proximity of lines on the film. These lines are in the sweep direction of the CRT, or perpendicular to the motion of the film in the camera. The capability of the radar to resolve these lines is a measure of the track resolution of the radar.

For testing track resolution, the test signal is obtained from free-running track resolution multivibrator 31. The frequency of oscillation of the multivibrator is determined by the ground speed that is being simulated and must be preset into the multivibrator. The detection capability of the radar, or the system performance ratio, is measured by determining the level of return signals which the receiver can detect at the existing transmitter power. The measurement is made by operating the radar transmitter, coupling a sample of transmitter energy to the ultrasonic delay line 25, FIG. 1, and reducing the power to the receiver in constant steps as described above to approach the minimum detectable signal level of the receiver. The sample of the transmitter pulse attenuated and delayed in fixed increments is returned to the radar via the same microwave waveguide from which the transmitter pulse was obtained. It is detected by the receiver, amplified, and presented to the recorder cathode ray tube where it is photographed by the film in the recorder 41. The resultant signals will appear on the film as spaced lines decreasing in density which are evaluated to measure the system performance ratio. This test provides a functional measure of power output, noise figure, receiver sensitivity, preamplifier gain, post-amplifier gain, video gain, AFC operation, and receiver bandwidth.

For the dynamic range test, signals ranging from minimum to maximum will be fed into the transponder for transmission to the radar. The dynamic range of the radar is the signal level over which the radar can discriminate targets above the noise level, before reaching saturation. Dynamic range may also be defined as the ratio of the maximum to minimum signal which can be handled without excessive distortion. For the dynamic range test, signals are derived from a sample of the radar transmitter output energy via directional coupler 13 and attenuator level set 16 and tuned by the transponder local oscillator network. These signals are returned to the radar in coincidence with recorder mapping time and are controlled in amplitude from minimum to maximum to simulate targets from sub-noise level to saturation level. The test signal is provided by the mapping I.F. gate 32. The mapping gate is open for the duration of the recorder mapping time. The level is set at the saturation level of the receiver and then reduced in steps by operating attenuator 18, FIG. 1 to minimum detectable level to cover the range of the receiver. The dynamic range signal is coupled into the transponder in the same manner as the track and range resolution signals. They are heterodyned with the local oscillator 20 of the test set to obtain a signal at the radar frequency and are fed via the attenuator 18, directional coupler network 14 and 13 to the radar receiver. The signal is detected by the radar receiver, presented to the radar recorder CRT and is photographed onto the film strip as areas with decreasing density which can be evaluated to determine radar dynamic range.

With the exception of the film scanner which contains separate controls, each portion of the test set is operated from a central control panel. The controls comprise a main power switch and pilot lights, two self-check switches and indicator lamps, radar system power supply checkout pushbutton and indicator lamps, test pattern generator pushbutton and indicator lamps, and film evaluator selector switch and indicator lamps.

Figure 3:
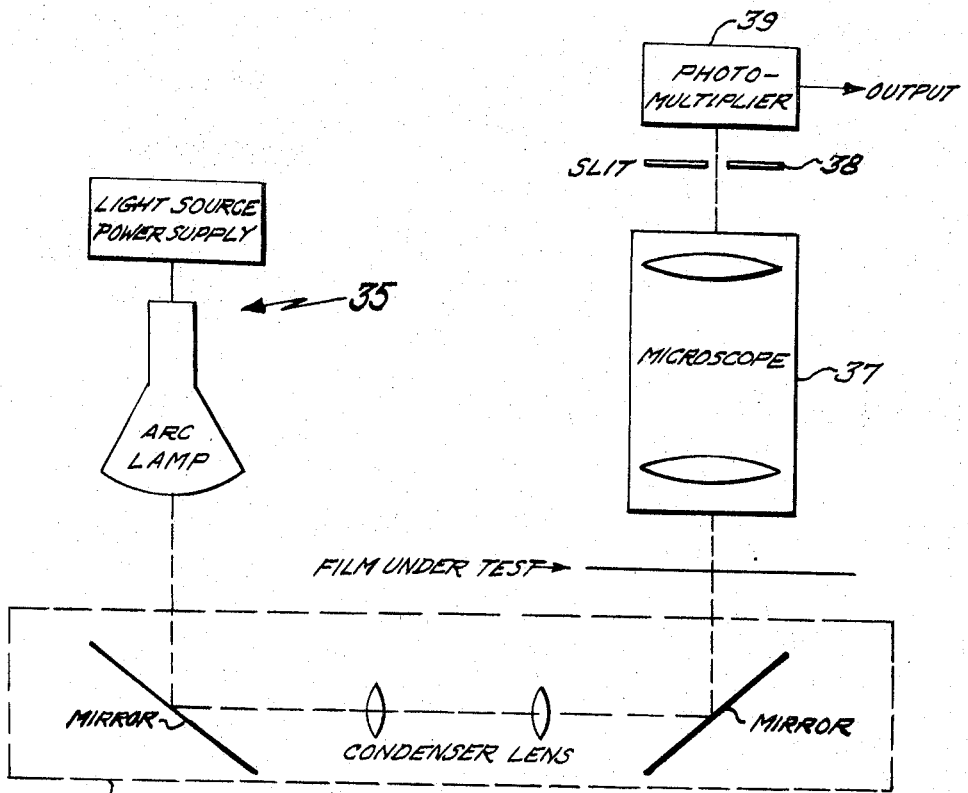
FIG. 3 is a pictorial drawing showing the optical system of the film scanner of the test set.

As seen in FIG. 3, the film scanner contains light source 35, light collimating system 36, the test film plane, lens system 37 for magnifying and focusing the film image on slit 38 and photomultiplier tube 39 for converting a varying light to electrical signals. The output of photomultiplier tube 39 converts a varying light signal to an electrical analog. This electrical signal can be fed to an amplifier chassis via front panel control switching. Three amplifiers can be utilized in which an AC amplifier can be used for resolution tests, a DC amplifier for system performance ratio test, and a DC operational amplifier for dynamic range test. After the test pattern has been reproduced on the film strip, the film is placed in the film scanner at the test film plane and evaluated to determine the condition of the radar system. This is accomplished by moving the film under the lens system 37 and monitoring the resultant signals in the scanner electronics portion of the test set.

As a result of the signals generated by the mapping radar test set, test patterns appear on the film which are now described. The first area is used to check range resolution. The test pattern generator frequency is chosen to produce equally spaced lines near the limit of resolution. Evaluation is accomplished by scanning in a direction perpendicular to the lines and counting the number of lines per unit distance. The next area is for track resolution and is evaluated in a similar manner. The track resolution lines appear in a direction perpendicular to the range resolution lines. The next area represents the dynamic range and appear as changing density levels. The number of levels is determined by the test pattern generator and evaluation is accomplished by scanning across each level and detecting the amplitude of the signal change. The area which represents dynamic range of the radar appears as an area with bands of different density levels. This area starts out as a transparent band in the track direction of the film, followed by a band of increasing density and then a yet darker band and continuing until the final band is completely opaque. Since the signal levels are determined by attenuator 18 of FIGURE 1, the ability of the radar system to respond with a smoothly increased density variation is a measure of its dynamic range. Then the number of density levels is determined by the attenuator setting and evaluation is accomplished by scanning across and detecting the amplitude of the signal change. Each step of equal amplitude change is proportional to an equal density change and is a measure of the dynamic range.

As previously mentioned, the ultra-sonic delay line 25 provides a train of pulses that decay with time. These pulses which occur during a mapping sweep period produce lines on the film in the same direction as the range resolution lines. These lines, however, utilized to measure system performance ratio, start out as bright lines and become faint and fainter as the train of pulses in the delay line decay with time. The number of discernible lines which are produced on a film strip is proportional to the ratio of system power output to receiver sensitivity. This is identified as a system performance ratio and is measured by noting the number of lines that are visible. The system performance ratio is the ratio of the transmitter peak power output to radar receiver sensitivity. It is a measure of the detection capability of the radar. The system performance ratio is measured by determining the level of return signals which the receiver can detect at the existing transmitter power. The measurement is made by operating the transmitter and reducing the power to the receiver in constant steps to approach the minimum detectable signal level of the receiver. The resultant signals will appear on film as lines and are evaluated by being passed between light source 35 and photomultiplier 39 to measure the system performance ratio. The number of discernible lines produced on the film strip is proportional to the ratio of system power output to receiver sensitivity. Evaluation is accomplished by noting the number of lines which are visible. Each area of the test pattern is scanned by moving the test film strip through the light path so as to modulate the light which reaches the photomultiplier tube.

The scanner electronic circuits receive the signal from the photomultiplier tube and prepare it for presentation to the individual evaluation circuit. The scanner electronic circuits contain three amplifiers: an A-C amplifier used for the resolution tests, and two D-C amplifiers used for the system performance ratio and dynamic range tests. Pulse shapers convert waveforms of various shapes to pulses capable of driving decimal counters. Pick-off circuits from the decimal counters energize the go-no-go indicator lamps dependent upon the results of the film evaluator tests.

What is claimed as new and desired to be secured by Letters Patent is:

1. Apparatus for testing the overall performance of a radar system including a pulsed transmitter having an output signal and a receiver comprising means for obtaining test set output signals at the radar transmitter frequency, means for developing a test pattern from said output signals, means for reproducing the test pattern on a film strip, means for optically scanning the film strip and producing light signals, and means for converting the light signals into electrical signals.

2. Apparatus for testing the overall performance of a radar system as in claim 1 wherein the means for obtaining test set output signals at the radar transmitter frequency comprise a mixer, and means for feeding the transmitter signal to the mixer for heterodyning said signal with a local oscillator signal.

No references cited.

RODNEY D. BENNETT, *Primary Examiner.*

T. H. TUBBESING, *Assistant Examiner.*